United States Patent [19]

Petersen et al.

[11] 4,120,786
[45] Oct. 17, 1978

[54] SEPARATION OF MIXED ION EXCHANGE RESINS

[75] Inventors: George E. Petersen, Fremont; James M. Dotson, Danville, both of Calif.

[73] Assignee: General Electric Company, San Jose, Calif.

[21] Appl. No.: 782,327

[22] Filed: Mar. 29, 1977

[51] Int. Cl.² .............................................. B03B 5/66
[52] U.S. Cl. .................................. 209/454; 209/158; 209/496; 210/33; 210/112; 210/126
[58] Field of Search ........................... 209/158–161, 209/454, 496, 491, 490, 455, 456; 210/33, 25, 96 R, 104, 189, 112, 126, 128, 84, 85

[56] References Cited

U.S. PATENT DOCUMENTS

| 1,472,317 | 10/1923 | Allen | 210/112 |
| 2,628,194 | 2/1953 | Gilwood | 210/25 |
| 2,985,305 | 5/1961 | Nock et al. | 210/96 X |
| 3,200,067 | 8/1965 | Levendusky | 210/33 X |
| 3,595,385 | 7/1971 | Duff | 209/160 X |
| 3,797,660 | 3/1974 | Miller | 209/160 X |

FOREIGN PATENT DOCUMENTS

| 2,330,930 | 2/1975 | Fed. Rep. of Germany | 209/158 |
| 843,536 | 8/1960 | United Kingdom | 209/161 |

Primary Examiner—Frank W. Lutter
Assistant Examiner—Ralph J. Hill
Attorney, Agent, or Firm—Ivor J. James, Jr.; Sam E. Laub; Samuel E. Turner

[57] ABSTRACT

A method and apparatus for separating a mixture of cation and anion resins is disclosed. The separation involves introducing the mixture of cation and anion resins to a treatment zone in countercurrent flow with a carrier fluid to achieve hydroclassification of the resins. The method and apparatus may be employed to separate cation and anion resins on either a batch or continuous basis.

18 Claims, 4 Drawing Figures

SEPARATION OF MIXED ION EXCHANGE RESINS

BACKGROUND OF THE INVENTION

1. Field of the Invention

In general, the invention is directed to a method of separating solid particles of nearly uniform size but differing densities in a fluid medium. More particularly, the invention is directed to a method and apparatus for separating a mixture of cation and anion exchange resins into constituent types of resins so that the resins may be chemically regenerated.

2. Description of the Prior Art

Contaminated fluids are often treated with ion exchange resins to remove the contamination from the fluid. One particular application of ion exchange resins for cleaning such fluids is in the operation of electric power plants. The water used in all power plants gradually builds up contamination consisting of corrosion and erosion products, and impurities in the incoming water.

In order to prevent excessive build-up of the contamination of the water in a power plant with resulting fouling of components it has become standard operating practice both in fossil and nuclear plants to use ion exchange resins to polish the condensate from the steam turbine. Furthermore, ion exchange resins are frequently employed in other areas of the plant to produce make-up water, to purify the primary coolant by sidestream purification, to purify liquid waste effluents and, in the case of a nuclear reactor, to purify water in fuel storage pools. These ion exchange resins are contained in demineralizers or ion exchange resin beds that are normally comprised of two parts by volume of a cation resin and one part per volume of an anion resin. Although it is possible to employ cation and anion resins in separate resin beds, mixed resin beds are preferred because they have a greater ion exchange efficiency.

At a certain point in the operation of these resin beds, the resins used to remove contamination from fluids experience (1) an excessive build-up of contamination on the surface of the resin particles and (2) a depletion of the ion exchange capability of the resin particles. Because of the expense of ion exchange resins it is impractical to dispose of these resins after one cycle, and according to the current practice depleted ion exchange resins are rejuvenated by ultrasonic cleaning to remove suspended solids from the external surface of the resins and by chemical regeneration to restore the ion exchange capability of the resins.

The present art of chemically regenerating ion exchange resins consists of a chemical treatment and a washing cycle for each type of resin. After the mixed resin is separated into a cation fraction and an anion fraction the cation resin is rejuvenated by addition of dilute acid solution and the anion resin is rejuvenated by addition of a dilute caustic solution. The residual acid and caustic solutions are removed from the resins by thorough rinsing with high purity water before the resins are recombined by air mixing and returned to the demineralizer system. One of the most important steps in the chemical regeneration process is the separation step since, if an incomplete separation is made, when the chemical treatments are applied to the respective resin types the fraction of the other type of resin contained therein will be damaged and useless for further ion exchange purposes.

Therefore the first step in a chemical regeneration process is isolation or separation of the different types of resins. In the separation technique most commonly practiced in the prior art the resin bed is removed from the demineralizer tank and transferred to a tank equipped for chemical regeneration. In this first tank the resin bed is backwashed with water to expand the bed to about twice its original volume. The backwash water is then stopped and the resins are allowed to settle. Since the cation resins are more dense than the anion resins they settle first to the bottom of the tank and stratification of the cation and anion resins occurs. After the resins have completely settled the anion resins are removed from the tank by means of an outlet pipe fixed to the side of the tank where the bottom of the anion layer should be. An example of an ion exchange rejuvenation process employing this prior art technique of separating cation and anion exchange resins is found in U.S. Pat. No. 3,385,787 to Crits et al. The difficulties with this prior art technique of separating resins are that only a predetermined volume of mixed resin having predetermined fractions of cation and anion resins may be processed, and the layers of cation and anion resins seldom form an interface at the exact level of the outlet pipe. Thus, either some cation resins are withdrawn from the tank with the anion resins or some anion resins are left behind in the tank with the cation resins. Additionally, the interface formed between the separated anion and cation resins by this technique is often not clearly defined. In any case an incomplete separation is usually made by the current separation technique and when the chemical treatments are applied to the respective resin types the fraction that is of the other type is damaged and rendered useless for further ion exchange purposes.

Prior art attempts to improve cation and anion separation techniques involve the use of sight glasses or transparent tanks to monitor the position of the interface between the separated cation and anion exchange resins. Examples of these types of prior art devices are found in U.S. Pat. No. 3,429,807 to Burgess and U.S. Pat. No. 3,634,229 to Stanley, Jr. A problem with prior art separation techniques using a sight glass or the like is that a human operator is required and the process is not easily automated.

Another problem with prior methods of separating mixtures of anion and cation exchange resins is that prior art techniques employ a batch separation method which is time-consuming when large quantities of resin need to be separated and treated. Also, prior art batch separation techniques are often not capable of separating varying volumes of a mixture of ion exchange resins comprised of varying fractions of a cation and anion exchange resin. Prior art batch separation techniques are usually limited to a predetermined volume of a mixture of resins made up of predetermined fractions of cation and anion resins.

Therefore, it is an object of the present invention to provide a method and apparatus for precisely separating a mixture of cation and anion resins into its constituent parts for chemical regeneration with a minimum of waste.

It is another object of the present invention to provide a method and apparatus for separating various volumes of a mixture of cation and anion exchange resins.

It is another object of the present invention to provide a method and apparatus for separating a mixture of ion exchange resins made up of varying fractions of a cation and anion exchange resin.

It is another object of the present invention to provide an automated apparatus for separating the mixture of cation and anion resins that requires little or no attention by a human operator.

It is another object of the present invention to provide a method and apparatus for continuously separating a mixture of cation and anion resins which is quicker and more precise than prior art batch separation methods.

SUMMARY OF THE INVENTION

These and other objects of the invention are carried out with the following method. The mixture of cation and anion resins is separated into constituent parts by introducing the mixture of resins and a carrier fluid to a treatment zone in countercurrent flow. Countercurrent flow as hereinafter used indicates a flow of carrier fluid generally counter to the flow of resins which is sufficient to fluidize the resins. Hydroclassification of the mixture of cation and anion resins is thereby achieved. The pH of the carrier fluid in equilibrium with the resins is monitored, and a change in the pH of the carrier fluid and resin mixture is used to indicate the position of the interface between the separated cation and anion resins. The separated cation resins are then removed from a level in the treatment zone below the interface between the separated resins. In a batch operation the pH of the carrier fluid and resin mixture is monitored at the bottom of the treatment zone and cation resins are removed from the bottom of the treatment zone until the pH of the carrier fluid and resin mixture at the bottom of the treatment zone becomes basic. Thereafter anion resins are removed from the treatment zone.

In a continuous operation the hydroclassifying, monitoring and resin removing steps are continuous and the additional step of continuously removing the separated anion resin from a level in the treatment zone above the interface between the separated resins is added. In the continuous operation an interface displacement signal is generated in response to a change in the density of the carrier fluid and resin mixture that occurs at the interface between the separated resins. This interface displacement signal is used to vary the rates of removal of the separated cation and anion resins for the purpose of restoring the interface to a predetermined position in the treatment one. Variations in the method may include both or only one of the pH sensing and density sensing steps.

The apparatus provided according to the invention comprises a separator tank or housing which defines a treatment zone receiving a countercurrent flow of the mixture of resins and a carrier fluid to hydroclassify the cation and anion resins. A mixed resin inlet is provided for introducing the mixed resin to the treatment zone. A fluid distributor is provided for introducing the carrier fluid to the bottom of the treatment zone. The carrier fluid moves up through the treatment zone to a carrier fluid drain at the top of the treatment zone. A pH monitor is provided for sensing the pH of the carrier fluid and resin mixture in the treatment zone, a change in pH indicating the level of the interface between the separated cation and anion exchange resins. If the apparatus is to be used only in a batch operation, the pH monitor is disposed at the bottom of the treatment zone and a cation resin outlet is provided that comprises a separated resin drain line connected to the tank at the bottom of the treatment zone and a valve in the separated resin drain line for controlling the removal of separated resins. First, separated cation resins are removed from the treatment zone by the operation of the valve until the pH at the bottom of the treatment zone becomes basic. Thereafter separated anion resins are removed by the operation of the valve.

In separators to be used in a continuous operation a separate anion resin outlet is provided at a level in the treatment zone above the interface between the cation and anion resins. In embodiments of the invention particularly adapted for continuous operation the separator includes means for generating an interface displacement signal comprising a float moving with the interface between the separated resins and a load cell connected to the float to generate an interface displacement signal. The interface displacement signal is then supplied to valve control means responsive to the interface displacement signal for varying the rates of removal of the separated anion and cation exchange resins and restoring the interface to a predetermined position in the treatment zone. Embodiments of the invention particularly adapted for continuous operation may employ both or only one of pH monitoring and density monitoring of the interface between the separated resins.

DESCRIPTION OF THE PREFERRED EMBODIMENTS

The method of the invention separates a mixture of cation and anion exchange resins into constituent parts by the following steps. The mixture of cation and anion resins is introduced to a treatment zone in countercurrent flow with a carrier fluid. The mixed resins are usually introduced to the top portion of the treatment zone. The carrier fluid is introduced at the bottom of the treatment zone. The carrier fluid flows up through the treatment zone in a direction generally counter to the flow of the resins and with sufficient velocity to fluidize the resins. The carrier fluid velocity required to fluidize the resins is largely a function of the size and density of the resin beads and is a matter of trial and error with different resin beads. Generally, a superficial carrier fluid velocity of 3 inches per minute is sufficient to fluidize the resins. The superficial velocity of 3 inches per minute is a calculated carrier fluid velocity neglecting the decrease in the cross section of the treatment zone occurring because of the presence of the resins.

The density of the carrier fluid, which is normally water, is less than that of the resins and although the size and shape of the cation and anion resins are very similar, the densities of the two resins are different. Cation resins have a specific gravity of approximately 1.1 and anion resins have a specific gravity of approximately 1.05 although the densities may vary somewhat between resins supplied by different manufacturers. The introduction of the mixed resins to the treatment zone in countercurrent flow with a carrier fluid of less density that the resins expands the volume of the resins to a fluidized bed where hydroclassification or stratification of the resins according to density occurs. This causes the cation resins to form a layer on the bottom of the treatment zone because of their greater density. The pH of the carrier fluid and resin mixture in the treatment zone is then monitored, a change in pH indicating the position of an interface between the separated cation and anion resins. The separated cation resins are then removed from a level in the treatment zone below the interface between the separated cation and anion resins.

In a batch operation the monitoring step of the method takes place at the bottom of the treatment zone. The separated cation resins are then removed from the bottom of the treatment zone until the pH of the carrier fluid and resin mixture at the bottom of the treatment zone become basic. Thereafter separated anion resins may be removed from the treatment zone. However, in some cases during a batch operation the anions may be left in the treatment zone where chemical regeneration of the anion resins will take place.

In a continuous operation the hydroclassifying, monitoring, and removal steps are continuous and the step of continuously removing the separated anion resin from the level in the treatment zone above the interface between the separated resins is added. Additional steps of the method which may be provided include the generation of an interface displacement signal in response to a change in the position of the interface between the separated cation and anion resins and varying the rates of removal of the separated cation and anion resins according to the interface displacement signal to restore the interface to its original position or to a predetermined position in the treatment zone. The interface displacement signal may be generated either by sensing the change in pH associated with the interface between the resins or by sensing the density difference between the separated cation and anion exchange resins.

In a preferred embodiment of the method, in a continuous operation, signals generated both from pH sensing and sensing of the density difference associated with the interface between the separated resins are employed. An interface displacement signal is generated in response to the difference in density associated with the interface between the separated resins and the rates of removal of the separated cation and anion exchange resins are varied according to the interface displacement signal to maintain the interface at a predetermined position in the treatment zone and thus maintain a constant steady state separation process. The pH sensing step takes place at the bottom of the treatment zone and when it is desirable to terminate the continuous separation process, control of the rates of removal of the separated resin by the interface displacement signal is terminated and the remaining cation resins are removed from the bottom of the treatment zone until the pH of the carrier fluid and resin mixture at the bottom of the treatment zone becomes basic. Thereafter the remaining anion resins are removed from the bottom of the treatment zone.

The method provided by the present invention yields excellent separation of mixed cation and anion exchange resins since, even when the method is practiced in a batch operation, hydroclassification of the particles is continuous. As the heavier resins are removed from the bottom of the separator tank the continuous hydroclassification insures that the resins will remain stratified during the removal steps. Continuous hydroclassification, of course, also allows the implementation of a continuous cation and anion separating process wherein additional mixed cation and anion resins are added and separated resins are withdrawn at a relatively constant rate. The method of the present invention may be easily implemented by an automated apparatus. The detection of the interface between the resins and the generation of an interface displacement signal is readily accomplished with a pH monitor, a density sensing float moving with the interface between the resins and a valve controller responsive to signals from the pH and density sensing means. Since the invention provides a method and apparatus for separating a mixture of resins that is responsive to the level of the interface between the separated resins various volumes of resin made up of varying fractions of cation and anion resins may be separated.

Figures 1, 2:
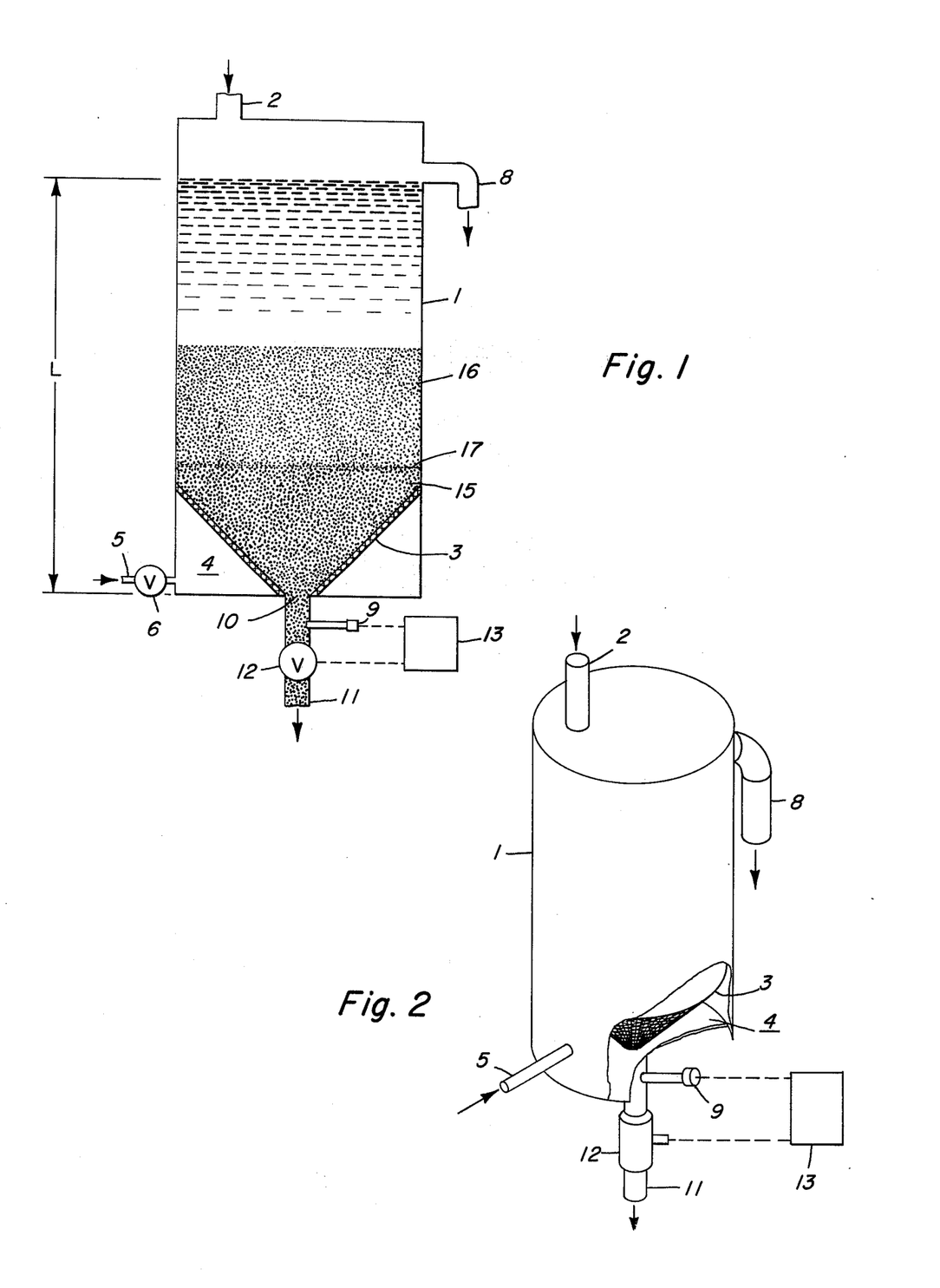
FIG. 1 is a front view in vertical section of a cation and anion exchange resin separator constructed according to the invention and particularly adapted to be used in a batch operation.
FIG. 2 is an isometric view partially in section of the embodiment of the invention illustrated in FIG. 1.

Referring to FIGS. 1 and 2 an embodiment of the invention particularly adapted for processing a mixture of cation and anion resins in a batch operation is illustrated. The separator is comprised of a cylindrical tank 1 defining a treatment zone having a length L for receiving a countercurrent flow of the mixture of cation and anion resins to be separated and a carrier fluid for hydroclassifying the resins. A resin inlet is provided at 2 for introducing the mixture of cation and anion resins to the top of the treatment zone. A fluid distributor is provided at 3 for introducing the carrier fluid uniformly across the bottom of the treatment zone. The fluid distributor 3 in this case comprises a fluid permeable, or perforated baffle of inverted conical shape which defines the bottom of the treatment zone. The conical-shaped baffle occupies the bottom of the cylindrical separator tank 1 separating the bottom of the treatment zone and an annular space 4 which acts as a distribution header for the carrier fluid introduced through inlet line 5. A valve 6 in line 5 controls the flow of carrier fluid into the annular space 4. A carrier fluid drain at 8 is provided for removing the carrier fluid from the top of the treatment zone.

Once hydroclassification of the resins is established the cation and anion resins will separate into two distinct layers in the treatment zone, the cation resins forming the bottom layer because of their greater density. A pH sensor 9 is provided for monitoring the pH of the carrier fluid and resin mixture in the treatment zone. A change in the pH of the resins indicates the level of an interface between the separated cation and anion resins. A cation resin outlet 10 is provided at the bottom of the treatment zone. In this case the pH sensor 9 is also disposed at the bottom of the treatment zone at the apex of the conical-shaped baffle to indicate when the interface between the separated cation and anion resins has reached the bottom of the treatment zone. The cation resin outlet 10 includes a drain line 11 having a valve 12 herein. The valve 12 is located in the drain line 11 as close as possible to the pH sensor 9 and the bottom of the separator tank. The pH sensor 9 is connected to a pH monitor 13 which automatically closes the valve 12 in response to a change in pH at the bottom of the treatment zone. In other embodiments of the invention pH monitor may be comprised of a simple meter which a human operator may use as an indication that the interface between the separated cation and anion resins has reached the level of the pH sensor 9.

An example of a pH sensing probe suitable for use as the probe 9 is manufactured by the Leads and Northrup Company; and is known by the trade name Meredian, part number D2.1211-DS. The monitor 13 may be any commercially available visual pH meter suitable for use with the probe 9. Suitable valves and valve controllers are manufactured, for example, by the Jamesbury Company. Jamesbury electrically operated ball valves of suitable size can be used as the valve 12. Ball valves or any other type of valve having a straight through bore are preferred because they reduce the possibility of damaging the resins and they minimize the possibility of the valve plugging with resin. In embodiments employing an automatically operated valve the monitor 13 comprises suitable amplification or signal conditioning circuitry for matching the output of the probe 9 to the input requirements of an electrically operated valve at 12.

In the operation of the separator illustrated in FIGS. 1 and 2 a batch of mixed cation and anion exchange resins is introduced to the separator through the inlet 2. A carrier fluid which is normally water is then supplied through inlet 5 to annular space 4 to enter the treatment zone through the conical-shaped fluid distributor 3. Once the carrier fluid fills the separator 1 and begins to overflow from the drain 8 the flow of carrier fluid is metered to a superficial velocity of approximately 3 inches per minute. An upward superficial water velocity of approximately 3 inches per minute has been found to be sufficient to expand the volume of the bed of mixed cation and anion exchange resins by about 25% of its initial volume. This causes hydroclassification of the resins in about 5 minutes to produce a complete separation of the resin types with the heavier cation resins 15 on the bottom of the treatment zone and the lighter anion resins 16 at the top of the treatment zone. After hydroclassification a sharp interface 17 is formed between the separated cation and anion resins. While the countercurrent flow of carrier fluid and the continuous hydroclassification insures the continued stratification of the cation and anion resins along a sharp interface, the outlet valve 12 is opened to drain the cation resins from the treatment zone. As the separated cation resins are removed from the bottom of the treatment zone, the resin interface 17 moves down in the treatment zone and eventually into the conical-shaped fluid distributor 3. As the interface 17 moves down through the conical-shaped distributor 3 the area of the interface is gradually contracted to yield a very sharp separation. When the interface passes the pH sensor 9 the pH indicated by the monitor 13 shows a sharp decrease in acidity and the outlet valve 12 is closed either manually or automatically by the pH monitor 13 to retain the anion resins in the separator tank 1. The cation resin that is removed from the bottom of the treatment zone may then be transported to a separate regeneration tank where chemical rejuvenation of the cation resin is accomplished. The remaining anion resin may then be chemically rejuvenated as it stands in the separator tank 1 or the valve 12 may be opened again to remove the remaining anion resin through the outlet 10 to a separate anion regeneration tank.

The excellence of the resin separation obtained with the separator illustrated in FIGS. 1 and 2 is attributable to a combination of several features. First, the continuous hydroclassification of the resins by incoming carrier fluid through the conical-shaped baffle while the heavier cation resins are being withdrawn from the separator insures the continued sharp stratification of the two resin types in the treatment zone. Second, the physical geometry of the separation tank with its inverted conical-shaped porous baffle enhances the separation by continuously decreasing the available area at the resin interface thereby reducing the amount of mixed resins at this interface. And third, the pH monitor provides for the rapid and accurate operation of the valve to place a physical barrier between the resin types at the location of the resin interface. The signal from the pH monitor indicating the presence of the interface between the separated resins is, of course, readily adaptable to control the operation of the resin outlet valve. Thus, the apparatus disclosed may be readily automated to carry out the process without the attention of a human operator. Mixtures of resins comprising varying fractions of cation and anion resins may be processed, and the amount of resin processed during a run is limited only by the physical size of the separator.

Figure 3:
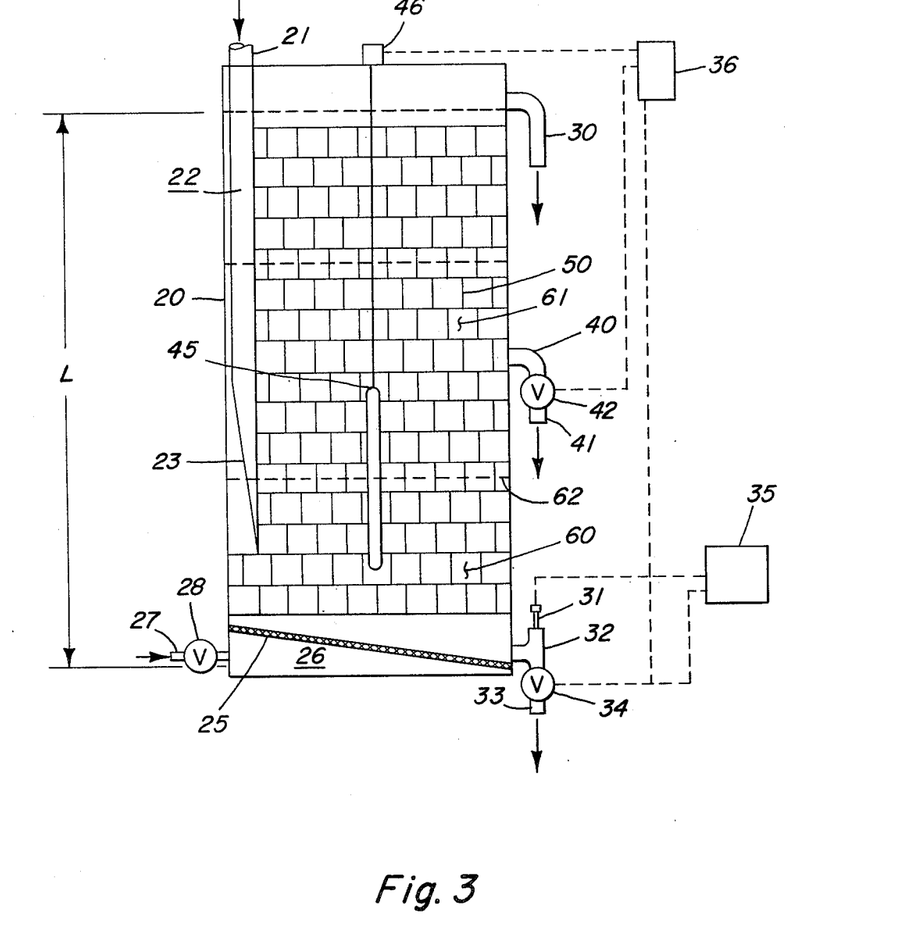
FIG. 3 is a front view in vertical section of a cation and anion exchange resin separator constructed according to the invention and particularly adapted to be used in a continuous operation.
Figure 4:
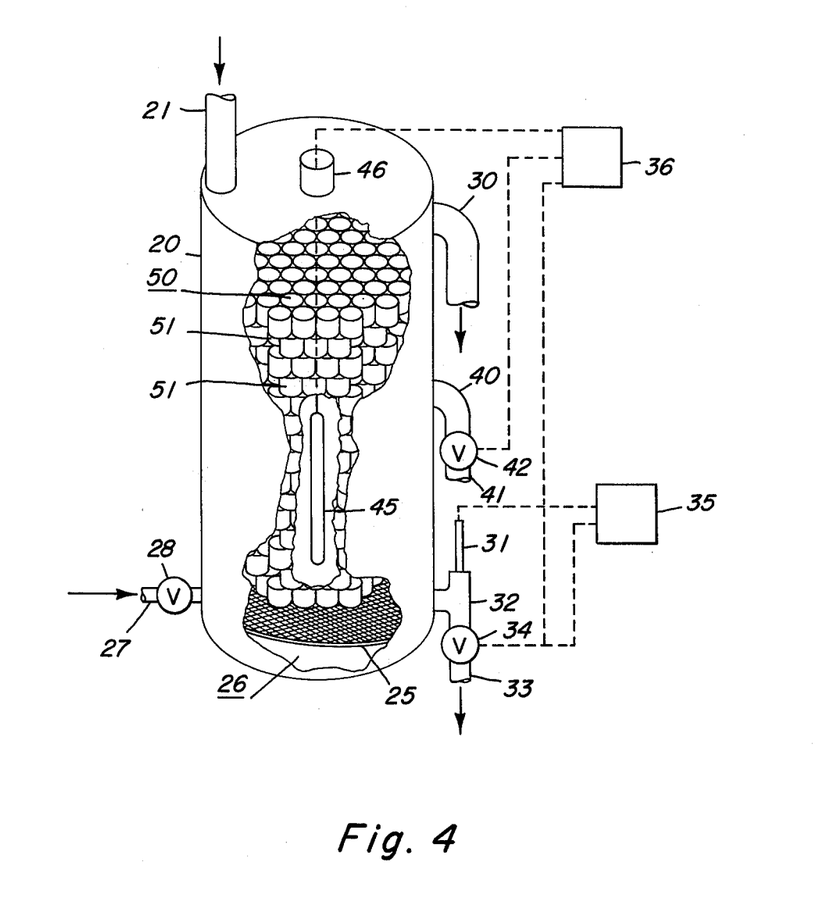
FIG. 4 is an isometric view particularly in section of the embodiment of the invention illustrated in FIG. 3.

Referring to FIGS. 3 and 4 an embodiment of the invention particularly adapted for processing a mixture of cation and anion resins in a continuous operation is illustrated. The continuous resin separator is comprised of a cylindrical separator tank 20 defining a treatment zone having a length L for receiving a countercurrent flow of the mixture of cation and anion resins to be separated and a carrier fluid for hydroclassifying the resins. The tank 20 includes a mixed resin inlet 21 for introducing the mixed resin to the treatment zone. In the continuous separator the mixed resin inlet comprises an inlet pipe 22 extending into the treatment zone with the end 23 of the pipe 22 being cut at an angle to minimize turbulence and mixing of separated cation and anion resins in the treatment zone. The angled end 23 of the pipe 22 is disposed in the treatment zone extending above and below the interface between the separated resins. A fluid distributor is provided at 25 for introducing the carrier fluid uniformly across the bottom of the treatment zone. In this case, the fluid distributor 25 comprises a sloped water permeable or perforated baffle, however, the conical-shaped baffle of FIG. 1 may alternately be employed. The sloped baffle 25 occupies the bottom of the cylindrical separator tank 20 separating the bottom of the treatment zone and a space 26 which is a distribution header for the carrier fluid introduced through inlet line 27. Line 27 includes a valve 28 for controlling the flow of carrier fluid. A carrier fluid drain at 30 is provided for removing the carrier fluid from the top of the treatment zone.

A pH sensor 31 is provided on a cation resin outlet 32 for sensing the pH of the carrier fluid and resin mixture at the bottom of the treatment zone. A change in the pH of the carrier fluid and resin mixture indicates that the interface between the separated cation and anion resins has been reduced to the level of the cation resin outlet 32. The cation resin outlet 32 includes a drain line 33 having a valve 34 therein. The valve 34 is located in the drain line 33 as close as possible to the pH sensor 31. The pH sensor 31 is connected to a pH monitor 35 for indicating the pH at the bottom of the treatment zone. The pH sensor 31 and pH monitor 35 generate a signal supplied to valve controller 36 which automatically closes the cation resin outlet valve 34 when the pH at the bottom of the treatment zone becomes basic.

In the continuous resin separator an anion resin outlet 40 is provided for removing the separated anion resin from a level in the treatment zone above the interface between the separated cation and anion resins. The anion resin outlet is comprised of a separated anion resin drain line 41 connected to the tank at a level in the treatment zone above the interface between the separated resins. A valve 42 is provided in the separated anion resin drain line to control the removal of anion resins. An interface displacement signal is detected by a westphal-type displacer 45 and a load cell 46. The westphal-type displacer 45 is essentially an elongated float sensitive to a change in density between the cation and anion resins. The position of the float changes with the position of the interface between the separated cation and anion resins. The displacer 45 is connected to a load cell 46 which generates an interface displacement signal in response to a change in the position of the interface between the separated resins in the treatment zone. The interface displacement signal is supplied to the valve controller 36 which varies the rates of removal of the separated cation and anion resins by controlling the openings of valves 34 and 42, respectively. The valve controller 36 thus responds to the interface displacement signal by varying the rates of removal of the separated cation and anion resins to maintain the interface between the separated resins at a predetermined level. By thus maintaining the interface at a proper level a continuous steady state separation is effected.

The continuous resin separator also includes calming baffles 50 to reduce turbulence and thus mixing the separated resins in the treatment zone from the continuous flow of incoming and exiting resins. The baffles 50 extend the length of the treatment zone from an area just below the carrier fluid drain 30 to an area just above the sloped fluid distribution baffle 25 at the bottom of the treatment zone. The construction of the baffles 50 is best illustrated in FIG. 4. Referring to FIG. 4 it may be seen that the baffles 50 are comprised of a plurality of stacked open-ended cylindrical or tubular members 51 arranged in offset arrays so that a honeycomb baffle-like structure filling the length of the treatment zone is formed.

The pH sensing probe 31, the cation outlet valve 34 and the anion outlet valve 42 may be of the same type specified for the batch separator illustrated in FIG. 1. Westphal-type displacers suitable for use with the present invention are also available commercially, for example, a type 2500-259B level controller with piezometer ring, manufactured by the Fisher and Porter Company, would be suitable for use with the present invention. In the present case the valve controller 36 and the pH monitor 35 comprise suitable amplification, or signal conditioning circuitry for matching the outputs of the westphal-type displacer and the pH sensor to the input requirements of electrically operated valves 34 and 42.

In the operation of the separator illustrated in FIGS. 3 and 4 the separator separates a mixture of cation and anion resins introduced through inlet 21 on a continuous basis. The carrier fluid, which is normally water, is introduced through line 27 to space 26 to enter the treatment zone through the slanted fluid distributor 25. Once the carrier fluid fills the separator tank 20 and begins to overflow from the drain 30 the flow of carrier fluid is metered to a superficial velocity of approximately 3 inches per minute. This expands the volume of the mixed resins to a fluidized bed in which hydroclassification will occur as in the batch type separator. Hydroclassification results in a layer of cation resins 60 on the bottom of the treatment zone and a layer of anion resins 61 on the top of the treatment zone with a rather sharply defined resin interface 62 therebetween.

After hydroclassification of the cation and anion resins is established separated cation and anion resins may be removed from the treatment zone through cation and anion resin outlets 32 and 40, respectively. The opening of the valves 34 and 42 in the cation and anion resin outlets, respectively, is then turned over to the valve controller 36. The valve controller 36 is responsive to the interface displacement signal generated by float 45 and load cell 46 to vary the rates of removal of the cation and anion resins and thus maintain the resin interface 62 at a relatively constant level in the treatment zone. At the end of a separator run, control of the position of the resin interface 62 by the interface displacement signal is terminated and the remaining cation resins are drained from the bottom of the treatment zone through cation resin outlet 32 until pH monitor 35 senses the presence of the anion resin. At that time pH monitor 35 automatically closes the cation outlet valve 34. Thereafter the valve 34 may be operated to drain the remaining anion resins from the tank. Thus the continuous resin separator may be operated in either a continuous or batch mode of operation.

The excellence of the resin separation obtained with the continuous separator illustrated in FIGS. 3 and 4 is attributable to the same basic features discussed with respect to the batch separator illustrated in FIGS. 1 and 2. These features are the continuous hydroclassification of the incoming resins, the physical geometry of the separator tank and the use of a pH monitor and/or density detector to control the separation process by monitoring the level of the interface between the separated resins. Both the batch and continuous separators may be readily automated and may be used to separate various volumes of mixed resins made up of widely differing fractions of anion and cation resins.

Obvious modifications of the aforementioned method and apparatus will occur to those skilled in the art. For example, the vertical orientation of the separation apparatus and the physical shape of the tank or housing defining the sides of the treatment zone may be varied. The orientation of the process could be completely reversed by employing a carrier fluid more dense than the incoming resins and the sloped or conically shaped baffle may be used in either a continuous or batch type apparatus. Whereas the method and apparatus described herein has particular advantages when applied to a water purification facility where a mixed bed of ion exchange resins is to be separated for chemical regeneration, other general applications of the method and apparatus may be useful in other industries. For example, in the chemical or mining industry the method and apparatus may be useful for the separation of a variety of similar sized granular materials having different densities. The method and apparatus could be useful in the separation of mineral bearing sands or in scrap reclamation processes.

These and other forms, embodiments and applications of the invention may occur to those skilled in the art and it is intended by the appended claims to cover all such modifications coming within the proper scope of the invention.

What is claimed as new and desired to be secured by Letters Patent of the United States is:

1. A method for separating a mixture of cation and anion exchange resins from each other comprising the steps of:

hydroclassifying the cation and anion resins by introducing the mixture of resins and a carrier fluid to a treatment zone in a countercurrent flow, monitoring the pH of the resins in the treatment zone, a change in the pH of the resins indicating the position of an interface between the separated cation and anion resins, and removing the separated cation resin from a level in the treatment zone below the interface between the separated cation and anion resins until the pH of the resin being removed becomes basic, and thereafter removing the separated anion resin from the treatment zone.

2. The method of claim 1 wherein:
the pH of the resins is monitored at the bottom of the treatment zone, and the separated cation resin is removed from the bottom of the treatment zone until the pH of the resin at the bottom of the treatment zone becomes basic.

3. The method of claim 1 where said hydroclassifying, said monitoring and said removing steps are continuous.

4. The method of claim 3 further including the step of:
simultaneously and continuously removing the separated anion resin from a level in the treatment zone above the interface between the separated cation and anion resins.

5. The method of claim 4 further including the steps of:
generating an interface displacement signal in response to a change in the position of the interface between the separated cation and anion resins, and
employing said interface displacement signal to vary the rates of removal of the separated cation and anion resins to restore the interface to its original position in the treatment zone.

6. The method of claim 5 wherein:
the interface displacement signal is generated by sensing the position of a density change occurring at the interface between the separated cation and anion resins.

7. The method of claim 6 wherein:
the pH of the resins is monitored at the bottom of the treatment zone, and
the separated cation resin is removed from the bottom of the treatment zone until the pH of the resin at the bottom of the treatment zone becomes basic.

8. Apparatus for separating a mixture of cation and anion exchange resins comprising:
a separator tank defining a treatment zone receiving a countercurrent flow of the mixture of resins and a carrier fluid to hydroclassify the cation and anion resins,
resin inlet means for introducing the mixture of resins to the treatment zone,
fluid distribution means for introducing the carrier fluid to the bottom of the treatment zone,
a carrier fluid drain for removing carrier fluid from the top of the treatment zone,
a pH monitor for sensing the pH of the resins in the treatment zone, said monitor being disposed at the bottom of the treatment zone, a change in the pH of the resins indicating the level of an interface between the separated cation and anion resins, and
cation resin outlet means for removing the separated cation resin from a level in the treatment zone below the interface between the separated cation and anion resins.

9. The apparatus of claim 8 wherein:
said cation resin outlet means comprises
(i) a separated resin drain line connected to said tank at the bottom of the treatment zone, and
(ii) a valve in the separated resin drain line for controlling the removal of separated cation and anion resins, so that
separated cation resins are removed from the treatment zone by the operation of said valve until the pH at the bottom of the treatment zone becomes basic, and then separated anion resins thereafter are removed by the operation of said valve.

10. The apparatus of claim 9 further including means for closing said valve automatically in response to a signal generated by said pH monitor when the pH at the bottom of the treatment zone becomes basic.

11. The apparatus of claim 9 wherein:
said fluid distribution means comprises a fluid permeable inverted conical shaped baffle defining the bottom of the treatment zone,
said pH monitor is disposed at the bottom of the treatment zone at the apex of said conical shaped baffle, and
said separated resin drain line is connected to said tank at the apex of said conical shaped baffle.

12. The apparatus of claim 8 further including:
anion resin outlet means communicating with the treatment zone at a level in the treatment zone above the interface between the separated cation and anion resins for removing the separated anion resin.

13. The apparatus of claim 12 further including:
interface displacement sensing means for generating an interface displacement signal in response to a change in position of the interface between the separated cation and anion resins, and
valve control means responsive to the interface displacement signal for varying the rates of removal of the separated cation and anion resins to restore the interface to a predetermined position in the treatment zone.

14. The apparatus of claim 13 wherein:
said cation resin outlet means comprises
(i) a separated cation resin drain line connected to said tank of the bottom of the treatment zone, and
(ii) a cation resin control valve in the separated cation resin drain line for controlling the removal of separated cation resins,
said anion resin outlet means comprises
(i) a separated anion resin drain line connected to said tank at a level in the treatment zone above the interface between the separated anion and cation resins, and
(ii) an anion resin control valve in the separated anion resin drain line for controlling the removal of separated anion resins,
said interface displacement sensing means comprises:
(i) a float moving with the interface between the separated cation and anion resins, and
(ii) a load cell connected to the float for generating an interface displacement signal in response to the movement of said float, and
said valve control means including means for receiving the interface displacement signal and means for generating a cation valve control signal and an anion valve control signal to vary the rates of removal of the separated cation and anion resins and restore the interface to a predetermined position in the treatment zone.

15. The apparatus of claim 14 wherein:

said pH monitor is disposed at the bottom of the treatment zone, and wherein said valve control means automatically effects closing of said cation resin control valve when the pH at the bottom of the treatment zone becomes basic.

16. The apparatus of claim 14 wherein:

said fluid distribution means comprises a fluid permeable sloped baffle defining the bottom of the treatment zone, and said separated cation resin drain line is connected to said tank adjacent the lowest portion of said sloped baffle.

17. The apparatus of claim 14 wherein:

said resin inlet means comprises an inlet pipe extending through said tank into the treatment zone, the end of said pipe being cut at an angle to minimize mixing of separated cation and anion resins in the treatment zone.

18. The apparatus of claim 14 further including:

an array of calming baffles filling the treatment zone to minimize the mixing of separated cation and anion resins.

* * * * *